May 13, 1947.  E. PALMER ET AL  2,420,615
MANUFACTURE OF CONCENTRATED COFFEE EXTRACT
Filed March 16, 1944  2 Sheets-Sheet 1
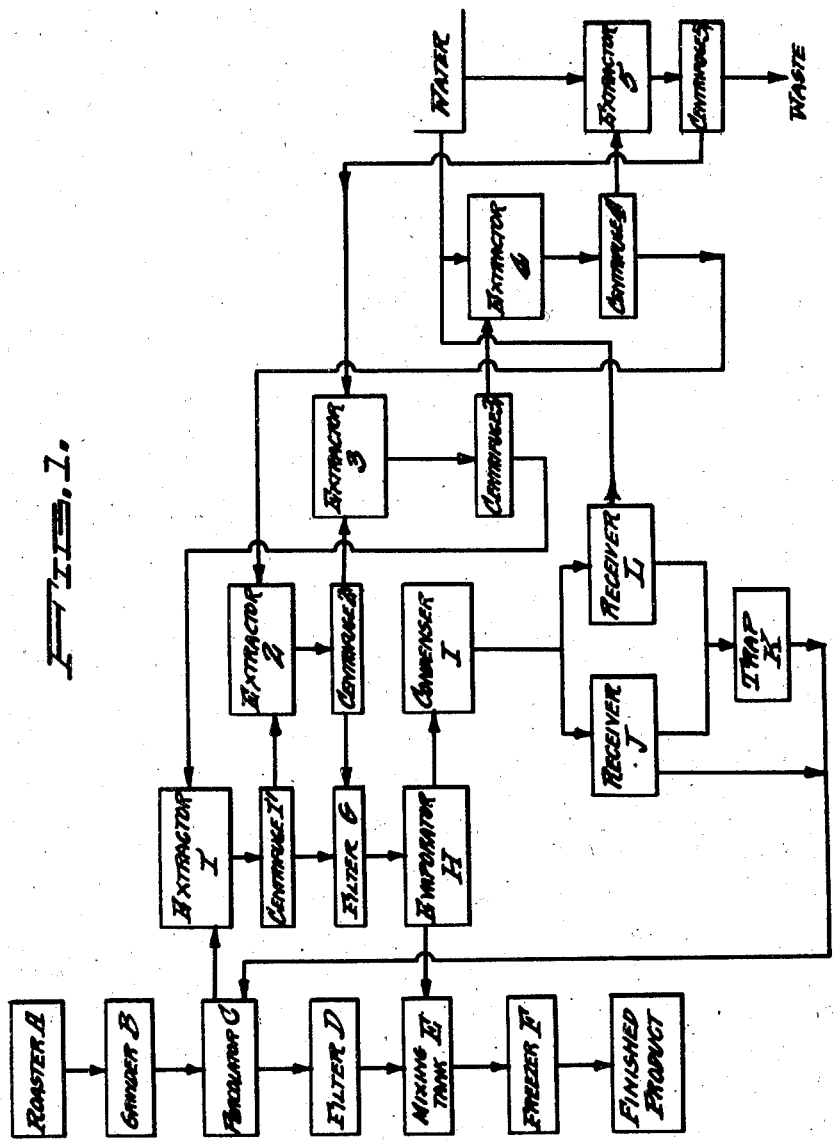
EDWIN PALMER
DAVID S. SCHWARTZ
INVENTORS.
BY
ATTORNEY.

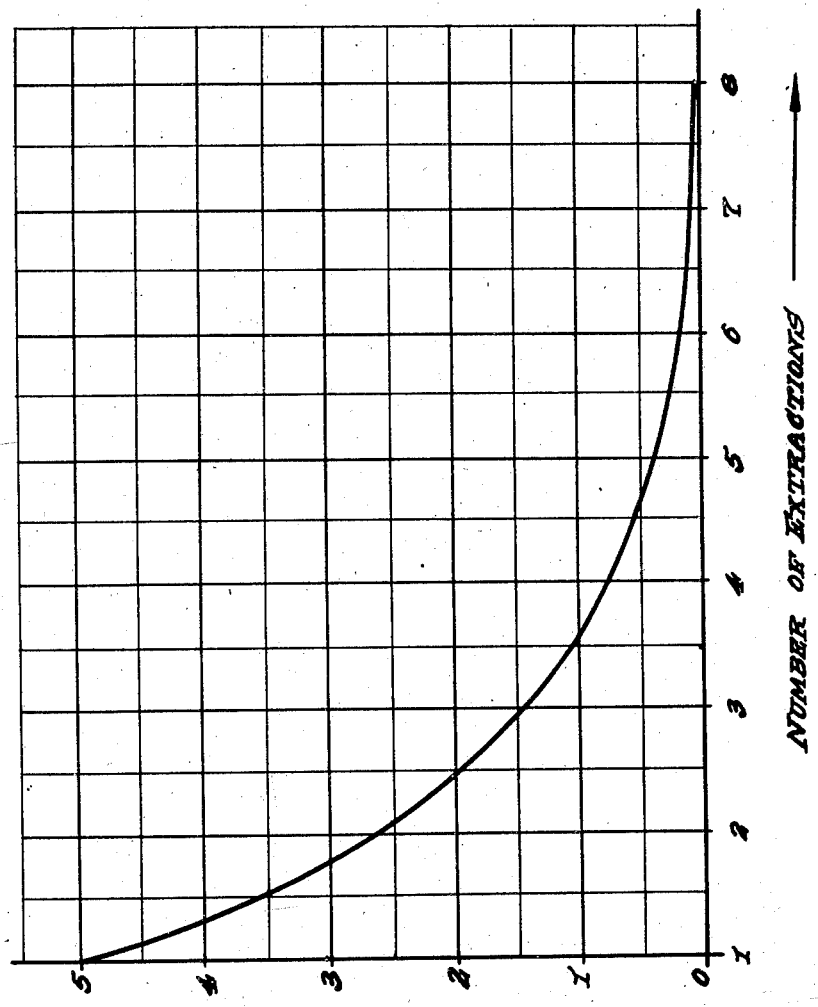

Patented May 13, 1947

2,420,615

UNITED STATES PATENT OFFICE 2,420,615

MANUFACTURE OF CONCENTRATED COFFEE EXTRACT

Edwin Palmer and David S. Schwartz, Brighton, Mass.; said Schwartz now by change of name David S. Roberts, assignors to Harry Sachs and Edwin Palmer, Baltimore, Md., copartners trading as Moorehead Manufacturing Company Application March 16, 1944, Serial No. 526,712

4 Claims. (Cl. 99—71)

This invention relates generally to an improved method of preparing a liquid coffee concentrate and preserving the same for distribution to the consumer.

The main object of the invention resides in the preparation of a liquid coffee concentrate from cold and hot water extractions of freshly roasted and freshly-ground coffee and from a fraction of the distillate resulting from evaporation of the hot water extractions.

Another object of the invention resides in the method of converting the liquid coffee concentrate obtained as set forth above into a frozen or semi-liquid form for distribution to the consumer by merely subjecting the said concentrate to quick freezing.

In effectuating the above objects of the invention, many shortcomings in the quality of coffee concentrates heretofore produced have been overcome. Many types of coffee concentrates have heretofore been manufactured but the flavor and aroma thereof either in concentrated or in diluted beverage form do not approach that of freshly brewed coffee. And to overcome rancidity or staleness caused by the rapid oxidation of the extracted coffee fats and spoilage due to bacterial and enzymic action in prior concentrates, it has been found necessary to add to these concentrates foreign substances such as antioxidants, preservatives and carrying agents, while coatings have been resorted to in the case of frozen concentrates. Dehydrated coffee concentrates, on the other hand, which do not require external or foreign agents to prevent rancidity and spoilage do not possess the aroma and flavor of freshly brewed coffee infusion when prepared for consumption because of the loss of the highly volatile constituents during manufacture.

In the method of preparation of the coffee concentrate herein, full flavor and aroma are retained by preventing losses of the highly volatile constituents of the freshly roasted and freshly ground coffee bean and by the absence of foreign agents and adulterants. The flavor and aroma of such a concentrate is preserved and put into a condition for distribution to the consumer by subjecting the concentrate to a quick freezing. Although methods have heretofore been developed for purposes of recovering some of the volatile constituents during hot extractions and returning them to the concentrated extracts, nevertheless, condensation and recovery of the vapors incidental to such extractions do not give the flavor and aroma of an infusion equivalent to freshly brewed coffee. In the percolation methods heretofore used, practical infusions with water produces a product having flavor and aroma but the product is lacking in body, taste and color; while in methods utilizing a series of hot extractions, concentration thereof by evaporation causes both loss of the aroma and flavor and also a change in the character thereof even where the distillate is returned to the residue.

Accompanying this specification are two sheets of drawings wherein:

Figure 1 is a flow sheet showing the various steps of manufacture in diagrammatic form.

Figure 2 is a graph showing the Baumé of successive hot extractions.

In accordance with the preferred manner of practicing the invention herein, a mixture of a cold extraction of the freshly roasted and freshly ground coffee bean and a concentrate of a hot water extraction of the same bean or multiple hot water extractions is prepared, the menstruum for the cold extraction being derived from the distillate of the hot water extraction or extractions during evaporation in a vacuum until the desired concentrations is obtained. By this procedure, practically all of the highly volatile constituents of the freshly roasted and ground coffee beans are retained: the cold extraction taking out the more volatile constituents, and the concentrate from the hot extractions retaining the water soluble and less volatile constituents of the beans.

Thus, by combining cold and hot water extractions and using as the menstruum for the cold extraction a fraction of the distillate resulting from partial evaporation of the hot water extractions, a concentrate is obtained which contains all the flavor, aroma, color and water soluble substances of the freshly roasted and ground coffee beans, and by quickly freezing this combination, the full flavor, aroma and quality of the coffee bean may be preserved.

Following the completion of the first cold extraction of the freshly roasted and finely ground coffee beans, the remaining soluble portions of the bean is extracted by a series of rapid and successive hot extractions with a minimum amount of water. When using as a menstruum for the same beans equal quantities of water at a constant temperature for equal periods of time and when equal volumes of liquid are extracted, the Baumé of the first hot extractions will decrease rapidly and the Baumé of the following extractions will decrease more slowly as it approaches its theoretical limit. This is best illustrated in Figure 2 wherein a curve is plotted in accordance with degrees Baumé and the number of extractions. From the graph it is seen that about five extractions will remove almost all of the water soluble matter and that any further extractions are not practicable on a commercial scale. Five rapid successive hot extractions are therefore used following the first cold extraction.

In the instant method of manufacture, the amount of water necessary to be evaporated in order to reach the desirable concentration of the finished product is kept at a minimum by using as the menstruum for an earlier extraction of the present batch, a later extraction of a similar previous batch, a closed system being utilized to minimize possible losses, and only two hot extractions are actually used for combination with the cold extraction. This is accomplished by running off a first batch with five successive hot extractions using the same amount of water under the same conditions of temperature as by taking 500 grams of freshly roasted and freshly and finely ground coffee beans and applying 625 cc. of water at 180 degrees F. then centrifuging and filtering. The residue is applied to a second extraction with 625 cc. of water at 180 degrees F., centrifuged and then filtered as before. The filtrates from these two extractions are led to an evaporator H. The residue from the second extraction is then passed through a third, fourth and fifth extraction in the same manner as the first and second extractions, the filtrates of said third, fourth and fifth extractions being used individually as a menstruum for the successive hot extractions of the second or succeeding batch. The filtrate from the first and second extractions in evaporator H is evaporated in a vacuum to 130 cc., the first fraction of the distillate amounting to 920 cc. and including the vapors recovered from a cooled trap K which did not condense in condenser I being used as a menstruum for the cold percolation of the succeeding batch while the 130 cc. concentrates after evaporation of the first batch is mixed with the cold extraction of the succeeding batch.

More specifically, Figure 1 indicates diagrammatically the steps of the process and the conventional equipment which may be employed. Thus, the green coffee beans are roasted in roaster A and then finely ground in grinder B. 500 grams of the ground coffee are put in a vapor-sealed jacketed percolator C and to this are added 920 cc. of the first fraction of the distillate from the previous batch above mentioned including the condensed vapor recovered from a specially cooled trap K. The trap is cooled and kept at a constant temperature by circulating cold water through the jacket thereof. After the beans are kept in the percolator in this condition for twelve hours, slow percolation takes place until a volume of 290 cc. is obtained after filtration through a filter D in the cooled receiving and mixing tank E. The partially spent beans are then put into a jacketed extractor 1 which is fitted preferably with an efficient mixing device. Then 625 cc. of the hot extract obtained from centrifuge 3 of the previous batch are used as the menstruum for this operation. This mixture is stirred for fifteen minutes at 180 degrees F. and is then passed through centrifuge 1'. The liquid extract obtained is then filtered through filter G and pumped into evaporator H. The remaining ground coffee beans are now put into extractor 2 and mixed with 625 cc. of hot menstruum obtained from centrifuge 4 of the previous batch. This mixture in extractor 2 is stirred for fifteen minutes at 180 degrees F. and is then centrifuged in centrifuge 2'. The 625 cc. of extract obtained is filtered through filter G and pumped into evaporator H where it is combined with the extract obtained from extractor 1. The remaining ground coffee beans from centrifuge 2' are put into extractor 3 and to this are added 625 cc. of the hot menstruum obtained from centrifuge 5' of the previous batch.

This mixture is stirred for fifteen minutes at 180 degrees F. and is then passed through centrifuge 3'. The remaining ground coffee beans are then put into extractor 4 and to this is added the remaining distillate from a previous batch which should be approximately 200 cc. This volume is broguht up to 625 cc. by the addition of water. This is stirred for fifteen minutes at 180 degrees F. and is then centrifuged through centrifuge 4'. The remaining ground coffee beans of centrifuge 4' are added to extractor 5 and to this are added 625 cc. of water. This is stirred for fifteen minutes at 180 degrees F. and is then passed through centrifuge 5'. The spent beans are removed and discarded.

The combined liquid extracts in evaporator H obtained from extractors 1 and 2 are concentrated by distillation under vacuum until a residue of 130 cc. remains. The vapors passing through condenser I are collected in the cooled receivers J and L, while the non-condensed vapors are collected in the special trap K which is kept very cold as by being surrounded by a freezing mixture, the condensate of said distillate and non-condensed vapors are then used as the menstruum for the cold percolation of the successive batch.

The concentrated extract from evaporator H consisting of 130 cc. is combined with 290 cc. of the cold extract in the mixing tank E to yield a total of 420 cc. of pure coffee concentrate and for preservation thereof this concentrate is then placed immediately into suitable containers and frozen solid in the quick freezer F.

By the process as above illustrated, a coffee concentrate is obtained which is equal in flavor and quality to a freshly brewed concentrate or which upon proper dilution will make a coffee beverage equal in flavor and quality to freshly brewed coffee.

The concentrate is 100% pure since no foreign ingredients are added. Moreover, by keeping the concentrate in a frozen condition, the concentrate retains its fine quality for long periods of time since bacterial and enzymic action are arrested and the flavor and aroma are sealed.

In the practice of the invention should it be necessary to suspend operations for any period of time, all the menstruums are kept in a cooled state. Furthermore, other types of equipment may be utilized other than those mentioned herein.

According to the preferred form of the invention described above, the extract is concentrated to a value wherein 6 cc. may be diluted with hot water to make up a cup of coffee having the aroma and flavor of the freshly brewed beverage. The concentrate may be frozen in trays to produce individual portions of 6 cc. each; and each portion may be wrapped while in frozen condition in moisture-proof and vapor-proof containers of Cellophane or vinyl-resin coated paper or foil containers. These individual portions so wrapped may then be placed in a larger container capable of holding a predetermined number of individual portions. The container may be kept in a refrigerated condition at all times. Instead of freezing individual portions of the concentrate as above stated a definite quantity of liquid may be frozen in a conveniently sized bottle and kept in this refrigerated condition until reaching the consumer. The consumer may then place such bottle in a refrigerator where the contents will thaw and liquefy. Thereafter, 6 cc. or a teaspoonful of this extract may be withdrawn from the bottle by the consumer to make a cup of pure, full-flavored beverage.

For institution and restaurant trade, the above measured quantities or containers are not necessary. Moreover, it is understood that the concentrate may be used for other purposes than for beverage purposes, such as in the confectionery, soda fountain, dairy and ice-cream trades.

We wish it understood that all modifications of the invention encompassed within the appended claims may be resorted to without departing from the spirit of the invention.

We claim:

1. The improvement in the production of a concentrated liquid coffee extract which comprises extracting ground roasted coffee with a cold distillate derived from concentrating a hot water extraction of a prior batch of ground roasted coffee, extracting the partially spent ground roasted coffee with hot or boiling water to form a hot water extract, concentrating the hot water extract and mixing the concentrated hot water extract with the cold distillate extract.

2. The improvement in the production of a concentrated coffee extract which comprises extracting ground roasted coffee with a cold distillate derived from concentrating a hot water extraction of a prior batch of ground roasted coffee, extracting the partially spent ground roasted coffee with hot or boiling water to form a hot water extract, concentrating the hot water extract, mixing the concentrated hot water extract with the cold distillate extract and quickly freezing the mixture for preservation.

3. The improvement in the production of a concentrated liquid coffee extract which comprises extracting ground roasted coffee with a cold distillate derived from concentrating a hot water extraction of a prior batch of ground roasted coffee, extracting the partially spent ground roasted coffee by successive hot extractions using as menstruums therefor respectively successive hot extractions of said prior batch of ground roasted coffee, concentrating the combined hot extracts so obtained and mixing the same with the cold distillate extract.

4. The improvement in the production of a concentrated coffee extract which comprises extracting ground roasted coffee with a cold distillate derived from concentrating a hot water extraction of a prior batch of ground roasted coffee, extracting the partially spent ground roasted coffee by successive hot extractions using as menstruums therefor respectively successive hot extractions of said prior batch of ground roasted coffee, concentrating the combined hot extracts so obtained, mixing the same with the cold distillate extract and quickly freezing the mixture for preservation.

EDWIN PALMER.
DAVID S. SCHWARTZ.

REFERENCES CITED

The following references are of record in the file of this patent:

UNITED STATES PATENTS

| Number | Name | Date |
| --- | --- | --- |
| 1,079,474 | Davis | Nov. 15, 1913 |
| 1,093,962 | Allison | Apr. 21, 1914 |
| 1,891,383 | Griffen et al. | Dec. 20, 1932 |
| 1,989,077 | Bredt | Jan. 29, 1935 |
| 2,098,961 | Fronmuller | Nov. 16, 1937 |
| 2,338,608 | Weisberg | Jan. 4, 1944 |
| 1,933,049 | Copes | Oct. 31, 1933 |